(12) United States Patent
Wang et al.

(10) Patent No.: US 11,531,908 B2
(45) Date of Patent: Dec. 20, 2022

(54) ENHANCEMENT OF MACHINE LEARNING-BASED ANOMALY DETECTION USING KNOWLEDGE GRAPHS

(71) Applicant: eBay Inc., San Jose, CA (US)

(72) Inventors: Hanzhang Wang, Santa Clara, CA (US); Phuong Viet Nguyen, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 932 days.

(21) Appl. No.: 16/351,453

(22) Filed: Mar. 12, 2019

(65) Prior Publication Data

US 2020/0293917 A1 Sep. 17, 2020

(51) Int. Cl.
*G06N 5/04* (2006.01)
*G06F 16/901* (2019.01)
*G06N 20/00* (2019.01)

(52) U.S. Cl.
CPC .......... *G06N 5/04* (2013.01); *G06F 16/9024* (2019.01); *G06N 20/00* (2019.01)

(58) Field of Classification Search
CPC .......... G06N 5/04; G06N 20/00; G06N 5/022; G06F 16/9024; G06F 7/023; H04L 41/16; H04N 21/251; H04N 21/466; H04N 21/45; H04N 21/46
See application file for complete search history.

(56) References Cited

U.S. PATENT DOCUMENTS

| | | | |
|---|---|---|---|
| 7,562,814 B1 * | 7/2009 | Shao | G06Q 20/40 235/375 |
| 7,818,224 B2 | 10/2010 | Boerner | |
| 8,539,359 B2 | 9/2013 | Rapaport et al. | |
| 8,805,839 B2 * | 8/2014 | Fitzgerald | H04L 63/20 707/737 |
| 9,031,951 B1 | 5/2015 | Baluja et al. | |
| 9,141,790 B2 * | 9/2015 | Roundy | G06F 21/577 |
| 9,298,525 B2 * | 3/2016 | Zhu | G06F 11/079 |
| 9,609,011 B2 | 3/2017 | Muddu et al. | |

(Continued)

FOREIGN PATENT DOCUMENTS

WO 2020/190753 A1 9/2020

OTHER PUBLICATIONS

Final Office Action received for U.S. Appl. No. 16/360,417, dated Mar. 25, 2021, 52 pages.

(Continued)

*Primary Examiner* — Michael Won
(74) *Attorney, Agent, or Firm* — FIG. 1 Patents

(57) ABSTRACT

Technologies are disclosed herein for enhancing machine learning ("ML")-based anomaly detection systems using knowledge graphs. The disclosed technologies generate a connected graph that defines a topology of infrastructure components along with associated alarms generated by a ML component. The ML component generates the alarms by applying ML techniques to real-time data metrics generated by the infrastructure components. Scores are computed for the infrastructure components based upon the connected graph. A root cause of an anomaly affecting infrastructure components can then be identified based upon the scores, and remedial action can be taken to address the root cause of the anomaly. A user interface is also provided for visualizing aspects of the connected graph.

20 Claims, 9 Drawing Sheets

(56) References Cited

U.S. PATENT DOCUMENTS

| | | | |
|---|---|---|---|
| 9,736,173 B2* | 8/2017 | Li | H04L 63/1416 |
| 9,836,183 B1 | 12/2017 | Love et al. | |
| 10,205,735 B2 | 2/2019 | Apostolopoulos | |
| 10,409,910 B2* | 9/2019 | Seow | G06N 3/088 |
| 10,728,263 B1 | 7/2020 | Neumann | |
| 11,269,718 B1* | 3/2022 | Chen | G06F 11/079 |
| 2004/0230385 A1 | 11/2004 | Bechhoefer et al. | |
| 2006/0036560 A1 | 2/2006 | Fogel | |
| 2006/0229931 A1* | 10/2006 | Fligler | G06Q 30/02 |
| | | | 705/7.38 |
| 2008/0208526 A1 | 8/2008 | Thibaux et al. | |
| 2014/0153396 A1 | 6/2014 | Gopalan et al. | |
| 2016/0019387 A1 | 1/2016 | Sol et al. | |
| 2016/0103838 A1* | 4/2016 | Sainani | H04L 41/5032 |
| | | | 707/725 |
| 2016/0350541 A1 | 12/2016 | Jenson | |
| 2016/0359872 A1* | 12/2016 | Yadav | H04L 63/1408 |
| 2016/0364794 A1* | 12/2016 | Chari | G06Q 40/02 |
| 2017/0032130 A1* | 2/2017 | Joseph Durairaj | H04L 41/16 |
| 2017/0075744 A1* | 3/2017 | Deshpande | H04L 41/0631 |
| 2017/0206557 A1* | 7/2017 | Abrol | G06Q 50/01 |
| 2017/0310556 A1* | 10/2017 | Knowles | H04L 67/38 |
| 2017/0330096 A1* | 11/2017 | Das Gupta | G06F 11/3409 |
| 2017/0359361 A1* | 12/2017 | Modani | H04L 63/1416 |
| 2018/0032386 A1* | 2/2018 | DeChiaro | G06F 11/0709 |
| 2018/0041528 A1* | 2/2018 | Machlica | H04L 41/12 |
| 2018/0063178 A1* | 3/2018 | Jadhav | H04L 63/1433 |
| 2018/0082122 A1* | 3/2018 | Verdejo | G06V 20/40 |
| 2018/0130019 A1 | 5/2018 | Kolb et al. | |
| 2018/0219888 A1 | 8/2018 | Apostolopoulos | |
| 2019/0281407 A1 | 9/2019 | Tian et al. | |
| 2019/0286757 A1* | 9/2019 | Muntés-Mulero | G06K 9/6215 |
| 2020/0293917 A1* | 9/2020 | Wang | G06N 5/022 |
| 2020/0301972 A1 | 9/2020 | Wang et al. | |

OTHER PUBLICATIONS

Cheng et al., "Detection and Characterization of Anomalies in Multivariate Time Series", In Proceedings of the 2009 SIAM International Conference on Data Mining. SIAM, 2009, pp. 413-424.

Eichler "Granger-Causality Graphs For Multivariate Time Series", Jun. 2001, 22 pages.

GITHUB "Anomaly Detection Software", Retrieved from the Internet URL: <https://github.com/rob-med/awesome-TS-anomaly-detection>, Jan. 11, 2019, pp. 1-5.

Page et al., "The PageRank Citation Ranking: Bringing Order to the Web", Technical Report. Stanford InfoLab., Jan. 29, 1998, pp. 1-17.

Thalheim et al., "Sieve: Actionable Insights from Monitored Metrics in Distributed Systems", In Proceedings of the 18th ACM/IFIP/USENIX Middleware Conference ACM, Dec. 11-15, 2017, 14 pages.

Wang et al., "Clickstream User Behavior Models", ACM Transactions on the Web, vol. 0, No. 0, Article 0, Mar. 2017, 35 pages.

Wang et al., "On the Use of Knowledge Graph to Enhance Machine Learning-Based Services Anomaly Detection", Accessed on Mar. 11, 2019, 3 pages.

Gao et al., "Detecting and characterizing social spam campaigns", Proceedings of The 1 Oth Annual Conference on Internet Measurement, IMC '10, ACM Press, Nov. 1, 2010, pp. 35-47.

Kumar,"Characterization and Detection of Malicious Behavior on the Web", Retrieved from the Internet: <URL:https://drum.lib.umd.edu/bitstream/handle/1903/19420/Kumar_umd_0117E_17927.pdf?sequence=1 &isAllowed=y>, Jan. 1, 2017, 223 pages.

Li et al., "A framework of identity resolution: evaluating identity attributes and matching algorithms", Security Informatics, vol. 4, No. 1, Jul. 28, 2015, 12 pages.

International Search Report received for PCT Application No. PCT/US2020/022719, dated Jul. 2020, 4 pages.

International Written Opinion received for PCT Application No. PCT/US2020/022719, dated Jul. 12, 2020, 11 pages.

Wang, "Clickstream User Behavior Models", ACM Transactions on the Web (TWEB), ACM New York,vol. 11, No. 4, Jul. 25, 2017, pp. 1-37.

Non Final Office Action Received for U.S. Appl. No. 16/360,417 dated Sep. 16, 2020, 42 Pages.

Non Final Office Action received for U.S. Appl. No. 16/360,417, dated Aug. 2, 2021, 52 pages.

International Preliminary Report on Patentability received for PCT Patent Application No. PCT/US2020/022719, dated Sep. 30, 2021, 10 pages.

U.S. Appl. No. 16/360,417, "Final Office Action", U.S. Appl. No. 16/360,417, dated Jan. 19, 2022, 50 pages.

* cited by examiner

ENHANCEMENT OF MACHINE LEARNING-BASED ANOMALY DETECTION USING KNOWLEDGE GRAPHS

BACKGROUND

Anomaly detection is a data-mining technique for identifying unusual patterns in data that do not conform to expected behavior. In the computing domain, anomaly detection is commonly utilized to identify incidents impacting the operation of computing devices, network components, and software components (which might be referred to herein as "information technology ("IT") infrastructure components" or simply "infrastructure components"). For example, anomaly detection might be utilized to identify unusual patterns in network traffic that indicate unauthorized access to infrastructure components.

Anomaly detection techniques commonly utilize supervised or unsupervised machine learning ("ML") and statistical methods. For example, supervised ML techniques for anomaly detection utilize training data that describes historical anomalies and corresponding values for audited metrics to identify anomalies. Other types of ML and non-ML techniques can be utilized to identify anomalies.

A root-cause analysis ("RCA") is commonly performed following the detection of an anomaly. RCA is a systematic process for identifying root causes of anomalies. RCA can be very complex, particularly in scenarios where there are hundreds or even thousands of co-dependent components and potential underlying causes for an anomaly. For instance, in the computing domain, an anomaly detected with respect to a network service might be caused by other network services, software components, server hardware, networking components, or other types of components. As a result, current anomaly detection and RCA identification systems commonly produce many false-positive alarms. The root causes of anomalies might therefore go undetected and the performance of infrastructure components associated with the anomalies might be negatively impacted.

It is with respect to these and other technical considerations that the disclosure made herein is presented.

SUMMARY

Technologies are disclosed herein for enhancing ML-based anomaly detection systems using knowledge graphs. The disclosed technologies address the technical problems presented above, and potentially others, by enhancing the functionality provided by ML-based anomaly detection systems in order to reduce or eliminate false-positive alarms. The disclosed technologies also enable quicker and more accurate identification of the root causes of anomalies, which can result in improved performance of computing resources that have been impacted by such anomalies. Further, data accuracy is improved because components with anomalies may be identified early, and appropriated remedial action taken to correct the anomalies. Other technical benefits not specifically mentioned herein can also be realized through implementations of the disclosed technologies.

In order to provide the technical benefits described above, and potentially others, the technologies disclosed herein generate a connected graph (which might be referred to herein as an "anomaly graph") using alarms generated by a ML-based anomaly detection system (which might also be referred to herein as an "anomaly detection system" or as an "ML component") and a system topology graph defining a topology for infrastructure components. The anomaly detection system generates alarms by performing a ML-based analysis of real-time data metrics generated by the infrastructure components. For example, and without limitation, the anomaly detection system might utilize a clustering-based model, a forecasting-based model, a smoothing-based model, or another type of supervised or unsupervised ML model to identify anomalies in the real-time data metrics.

In some configurations, the connected graph includes nodes (which might be referred to herein as "infrastructure nodes") that correspond to infrastructure components. These nodes can be connected to one another via edges that represent dependencies between the infrastructure components.

The connected graph can also include nodes (which might be referred to herein as "alarm nodes") that correspond to the alarms generated by the ML-based anomaly detection system. Alarm nodes can be connected to infrastructure nodes in the connected graph by way of edges that define an association between an infrastructure component and an alarm. For instance, an infrastructure node corresponding to a server computer could have an associated edge that connects to an alarm node when a ML-based anomaly detection system generates an alarm indicating a potential anomaly with the server computer.

Scores for the infrastructure components can be computed based upon the connected graph. In one embodiment, for example, scores (which might be referred to herein as "edge scores") can first be computed for edges in the connected graph that connect alarm nodes and infrastructure nodes. The edge scores can be computed based upon a frequency of a corresponding alarm and a frequency of the corresponding alarm among all alarms. Scores (which might be referred to herein as "node scores") for the infrastructure nodes can then be computed by generating a score for each of the infrastructure nodes based on the edge scores. These scores can be propagated between the infrastructure nodes.

Once the connected graph has been generated, the node scores can be utilized to identify a root cause of an anomaly. For example, an infrastructure component having the highest node scores might be identified as the cause of an anomaly. Remedial action can then be taken to address the root cause of the anomaly. For example, and without limitation, impacted infrastructure components might be restored to their most recent healthy state, rebooted, initialized, or otherwise reconfigured. Other types of remedial action can also be taken in other configurations.

The connected graph can also be utilized to generate a user interface ("UI") for visualizing the relationships between an infrastructure component identified as the cause of an anomaly, other infrastructure components, and related alarms. For example, and without limitation, the UI can include UI elements (e.g. a circle, square, or other geometric shape) that correspond to infrastructure components, such as an infrastructure component identified as the root cause of an anomaly and its dependent infrastructure components.

The UI can also include UI elements (e.g. straight or curved lines) connecting the UI elements that correspond to the infrastructure components. The UI can also include UI elements that correspond to alarms and UI elements that indicate an association between an alarm and a node corresponding to an infrastructure component. In some configurations, various attributes (e.g. color, line thickness, or size) of visual elements in the UI can be modified based upon the computed node scores, the severity of an alarm, or other factors.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

The following Detailed Description presents technologies for enhancing ML-based anomaly detection systems using knowledge graphs. As discussed briefly above, and in greater detail below, the disclosed technologies can enhance the functionality provided by ML-based anomaly detection systems in order to reduce or eliminate false-positive alarms. The disclosed technologies can also enable quicker and more accurate identification of the root causes of anomalies, which can result in improved performance of computing resources that have been impacted by such anomalies. Further, data accuracy can be improved because components with anomalies may be identified early, and appropriated remedial action taken to correct the anomalies. Technical benefits other than those specifically mentioned herein might also be realized through implementations of the disclosed technologies.

It is to be appreciated that while the technologies disclosed herein are primarily described in the context of identifying the root causes of anomalies impacting IT infrastructure components, the technologies described herein can be utilized to identify the root causes of anomalies in other types of systems and data in other configurations, which will be apparent to those of skill in the art.

Referring now to the appended drawings, in which like numerals represent like elements throughout the several FIGS., aspects of various technologies for enhancing ML-based anomaly detection systems using knowledge graphs will be described. In the following detailed description, references are made to the accompanying drawings that form a part hereof, and which are shown by way of illustration specific configurations or examples.

Figure 1A:
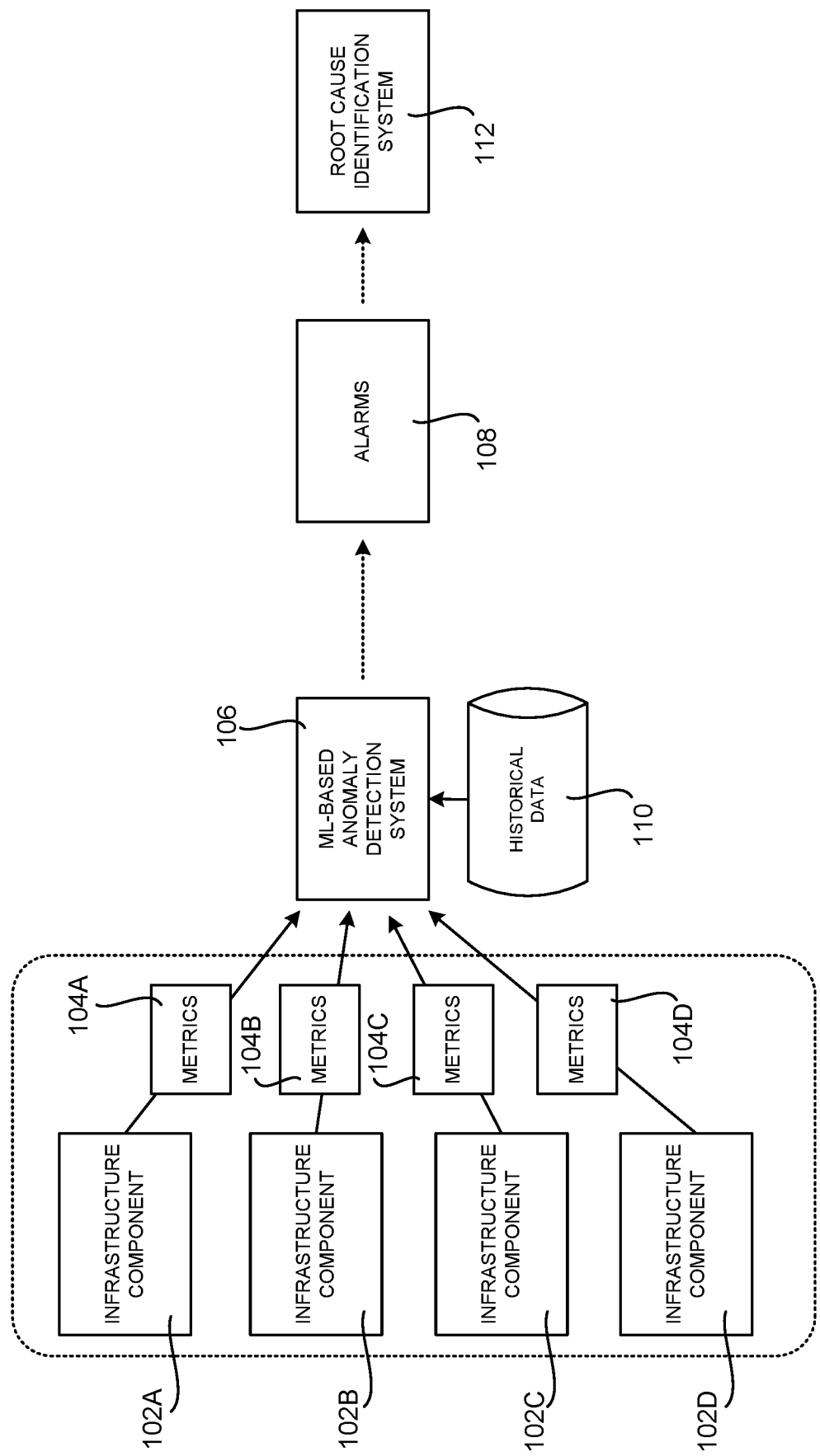
FIGS. 1A, 1B, and 2 are computing system architecture diagrams showing aspects of a system disclosed herein for enhancing ML-based anomaly detection systems using knowledge graphs, according to one embodiment disclosed herein.

FIG. 1A is a computing system architecture diagram showing an overview of a system disclosed herein for enhancing ML-based anomaly detection systems using knowledge graphs, according to one embodiment disclosed herein. As shown in FIG. 1A, a ML-based anomaly detection system 106 (which might also be referred to herein as an "anomaly detection system" or as an "ML component") is configured to identify infrastructure anomalies based upon real-time data metrics 104A-104D ("metrics") generated by infrastructure components 102A-102D (which might be referred to individually as an "infrastructure component 102" or collectively as the "infrastructure components 102").

The infrastructure components 102 can include, but are not limited to, physical computing devices such as server computers or other types of hosts, associated hardware components (e.g. memory and mass storage devices), networking components (e.g. routers, switches, and cables), racks for mounting physical components, power supplies, and cables. The infrastructure components 102 can also include software, such as operating systems, applications, and containers, network services, virtual components, such as virtual disks, virtual networks, points of deliver ("PoDs"), and virtual machines, and data, such as a database, a database shard (i.e. a partition of a database), a keyspace, a replica, or a zone. The infrastructure components 102 can include other types of components for supporting an IT infrastructure other than those specifically identified herein.

As discussed briefly above, anomaly detection is a data-mining technique for identifying unusual patterns in data that do not conform to expected behavior. In the computing domain, anomaly detection is commonly utilized to identify incidents impacting infrastructure components 102, such as those identified above. For example, anomaly detection might be utilized to identify unusual patterns in network traffic that indicate unauthorized access to infrastructure components 104.

In the example system shown in FIG. 1A, the ML-based anomaly detection system 106 utilizes real-time data metrics 104 obtained from the infrastructure components 102 to identify anomalies. The real-time data metrics 104 can include machine metrics, business metrics, application metrics, and other types of metrics. Machine metrics describe aspects of the operation of hardware components such as, but not limited to, metrics describing processor utilization, memory utilization, network utilization, error counts, transactions per second ("TPS"), |JAVA garbage collection overhead ("JGCOVH"), and load balancer stacked connections.

Business metrics include, but are not limited to, metrics describing aspects of the operation of business services provided by the infrastructure components 102 such as, for example, the number of e-commerce sales processed by the infrastructure components 102 for a particular geographic region within a particular time period. Application metrics are metrics describing the operation of an application or other type of software component such as, for example, the number of requests processed by an application per a specified time period. The real-time data metrics 104 can include other types of metrics generated by other types of components in other configurations.

In some configurations, the ML-based anomaly detection system 106 utilizes supervised and/or unsupervised ML technologies to identify anomalies. For example, the ML-based anomaly detection system 106 might utilize supervised ML techniques by training on historical data 110 that describes historical infrastructure anomalies and corresponding values for the real-time data metrics 104 to identify anomalies.

Figure 1B:
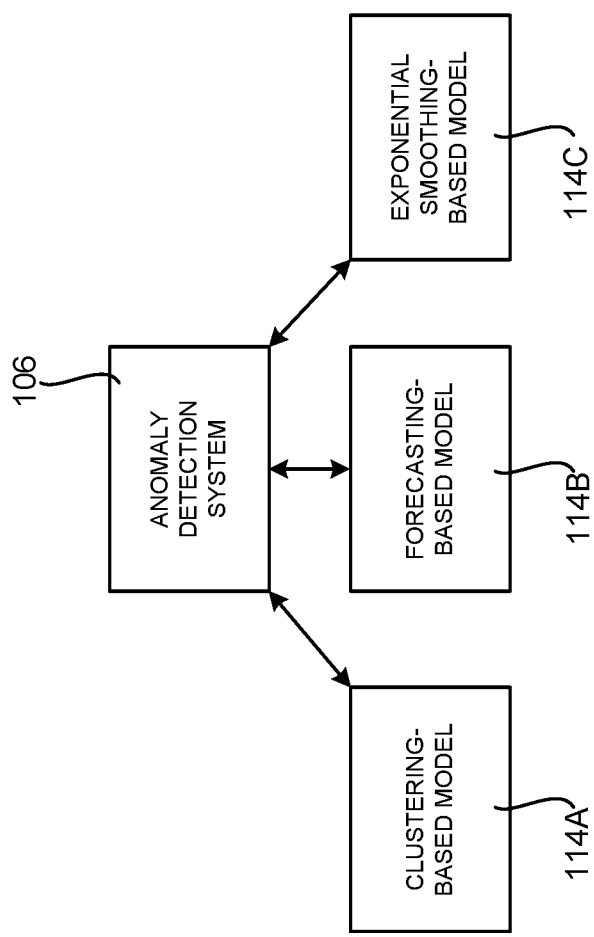

As shown in FIG. 1B, the ML-based anomaly detection system might also, or alternately, utilize unsupervised ML techniques to identify anomalies including, but not limited to, a clustering-based model 114A, a forecasting-based model 114B, a smoothing-based model 114C, or another type of unsupervised ML model.

The clustering-based model 114A can be utilized to detect outliers (i.e. anomalies) in a group of targets (e.g. infrastructure components 102 or associated metrics 104) sharing similar behavior. The forecasting-based model 114B can be utilized to determine if a target behaves differently from its typical behavior. The smoothing-based model 114 can be used to determine if a target behaves different from what it has done in the recent past. The anomaly detection system 106 can utilize other types of ML techniques to identify anomalies in other configurations.

As shown in FIG. 1A, the ML-based anomaly detection system 106 can generate an anomaly alarm 108 (which might be referred to herein simply as an "alarm") following the detection of an anomaly. Alarms 108 can include various types of data, including data identifying the anomaly. A stream of alarms 108 is provided to a root cause identification system 112 in one configuration.

As discussed briefly above, a root-cause analysis ("RCA") is commonly performed following the detection of an anomaly. RCA is a systematic process for identifying root causes of anomalies. RCA can be very complex, particularly in scenarios where there are hundreds or even thousands of co-dependent components and potential underlying causes for an anomaly. For instance, in the computing domain, an anomaly detected with respect to a network service might be caused by other network services, software components, server hardware, networking components, or other types of components.

Current ML-based anomaly detection and RCA systems commonly produce many false-positive alarms. This can be due, in part, to the lack of available training data for use in supervised ML or the inability to determine how available data corresponds to an abnormality. Current ML-based anomaly detection and RCA systems also do not consider the co-dependent relationships between system components. For example, database shards deployed on the same host or physical rack could potentially share the same root cause during an anomaly. As a result of these shortcomings with previous anomaly detection and RCA systems, the root causes of anomalies might go undetected and, as a result, the performance of IT infrastructure components associated with the anomalies might be negatively impacted. The root cause identification system 112 shown in FIG. 2 and described in detail herein is configured to address these and other technical considerations.

Figure 2:
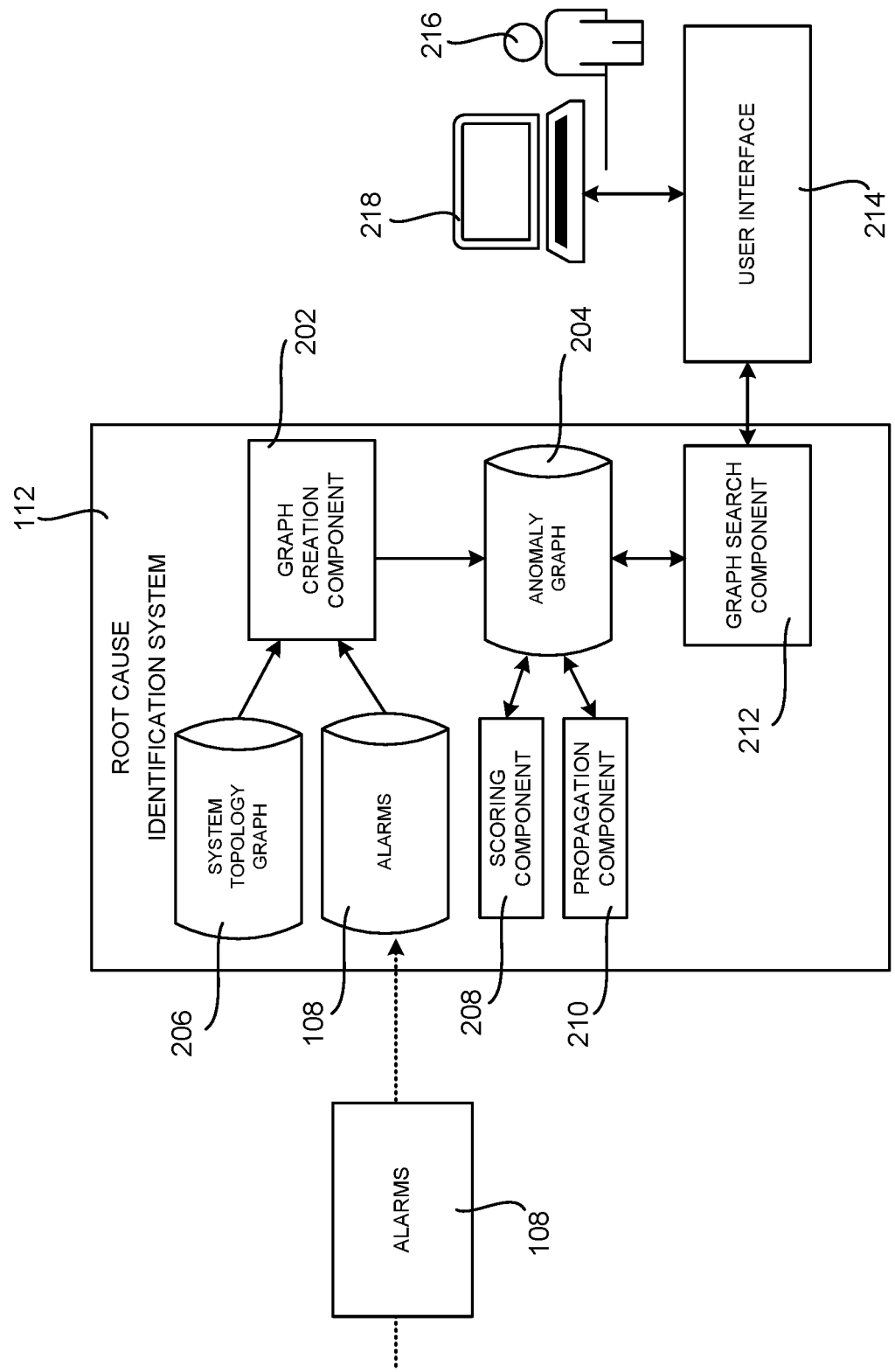

FIG. 2 is a computing system architecture diagram showing additional aspects of the system shown in FIG. 1 for enhancing ML-based anomaly detection systems 106 using knowledge graphs, according to one embodiment disclosed herein. As shown in FIG. 2 and described briefly above, the root cause identification system 112 receives anomaly alarms 108 from the ML-based anomaly detection system 106 shown in FIG. 1A and described above. The root cause identification component 210 might be a software component, a hardware component, or a combination hardware/software component, according to various embodiments.

Generation of Anomaly Graph

In one embodiment, a graph creation component 202 generates a connected graph (which might be referred to herein as a "knowledge graph" or the "anomaly graph 204") using the alarms 108 generated by the ML-based anomaly detection system 106 and a system topology graph 206. The system topology graph 206 defines a topology for the infrastructure components 102. An example system topology graph 206 is shown in FIG. 4.

Figure 4:
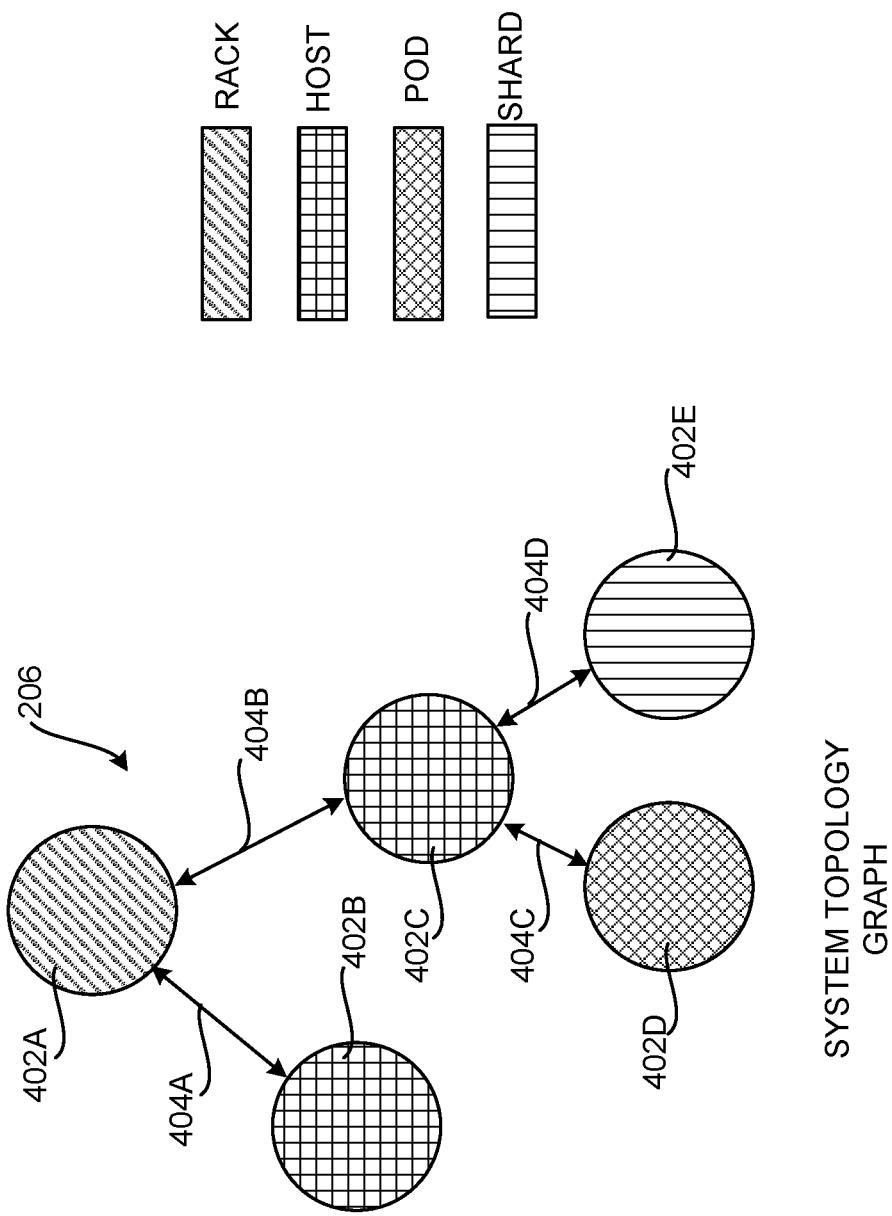
FIGS. 4 and 5 are connected graph diagrams showing aspects of an illustrative system topology graph and an anomaly graph, respectively.

As illustrated in FIG. 4, the system topology graph 206 is a connected graph having nodes 402A-402E that correspond to infrastructure components 102. In the example shown in FIG. 4, for instance, the node 402A corresponds to a rack (e.g. a rack for housing servers or networking components), the nodes 402B and 402C correspond to hosts (e.g. a physical or virtual servers), the node 402D corresponds to a PoD, and the node 402E corresponds to a database shard.

As also illustrated in FIG. 4, the system topology graph 206 also includes edges 404A-404D that indicate dependencies between infrastructure components 102 represented by the nodes 402. For example, the edge 404A indicates a dependency between a rack and a host (e.g. the host is mounted in the rack), the edge 404B indicates a dependency between a rack and another host, the edge 402C indicates a dependency between a host and a PoD, and the edge 404D indicates a dependency between a host and a database shard. The dependencies represented by the edges 302 in the system topology graph 206 can be unidirectional (i.e. one infrastructure component 102 depends upon another infrastructure component 102) or bi-directional (i.e. two infrastructure components 102 depend upon one another).

It is to be appreciated that the illustrative system topology graph 206 shown in FIG. 4 has been simplified for discussion purposes and that an actual system topology graph 206 can have many more nodes 402 and edges 404 than illustrated. The system topology graph 206 can also include other information not shown in FIG. 4 such as, but not limited to, data describing various attributes of the represented infrastructure components 102 and their dependencies.

In order to generate the anomaly graph 204, the graph creation component 202 obtains the system topology graph 206, or a portion of it. The graph creation component 202 also obtains the alarms 108 from the ML-based anomaly detection system 106. The graph creation component 202 then generates the anomaly graph 204 by annotating the system topology 206 with the alarms 108. An illustrative anomaly graph 204 is shown in FIG. 5 and described below that corresponds to the example system topology graph 206 shown in FIG. 4.

Figure 5:
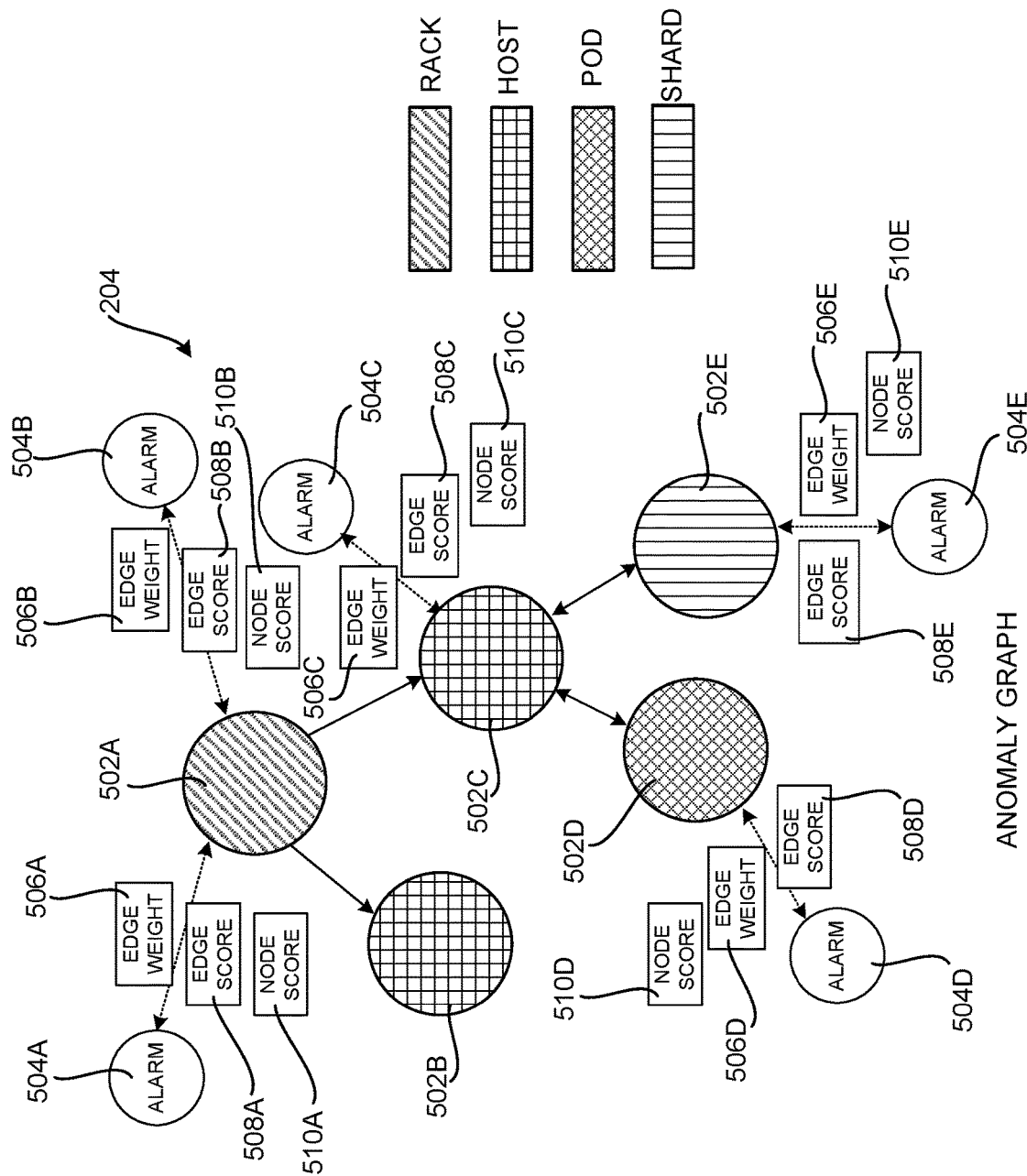

As illustrated in FIG. 5, the anomaly graph 204 generated by the graph creation component 202 includes nodes 502A-502E (which might be referred to herein as "infrastructure nodes 502") that correspond to infrastructure components 102. The nodes 502 can be connected to one another via edges (which might be referred to herein as "infrastructure edges") that represent dependencies between the corresponding infrastructure components 102. The nodes 502 and their connecting edges are defined by the system topology graph 206 in the manner described above.

As also illustrated in FIG. 5, the anomaly graph 204 can also include nodes (which might be referred to herein as "alarm nodes 204") that correspond to the alarms 108 generated by the ML-based anomaly detection system 106. Alarm nodes 204 can be connected to infrastructure nodes 502 in the anomaly graph 204 by way of edges (which might be referred to herein as "alarm edges") that define an association between an infrastructure component 102 and an alarm 108. For instance, an infrastructure node 502 corresponding to a host (e.g. the node 502C) could have an associated edge that connects to an alarm node (e.g. the node 504C) when the ML-based anomaly detection system 106 generates an alarm 108 indicating a potential anomaly with the host.

As will be described in greater detail below, the anomaly graph 204 might include additional information such as, but not limited to, edge weights 506A-506E, edge scores 508A-508E, and node scores 510A-510E. Details regarding various mechanisms for computing the edge weights 506A-506E, edge scores 508A-508E, and node scores 510A-510E are provided below. The anomaly graph 204 can include other information in other configurations. In this regard, it is to be appreciated that the illustrative anomaly graph 204 shown in FIG. 5 has been simplified for discussion purposes and that an actual anomaly graph 204 can have many more nodes 502 and edges than illustrated.

Computation of Edge Weights

As described briefly above, scores for the infrastructure components 102 in all or a portion of the anomaly graph 204 during a period of time can be generated by computing edge weights 506, edge scores 508, and node scores 510. In one embodiment, the edge weights 506 are computed as the frequency of a specific alarm 108 with respect to a particular infrastructure component 102. In the example shown in FIG. 5, for instance, the alarm edge between the node 502C and the node 504C would have a value of five if the host represented by the node 502C triggered the alarm represented by the node 504C five times. Other mechanisms can be utilized to compute edge weights 506 in other configurations.

Computation of Edge Scores

Edge scores 508 can be computed for edges (i.e. alarm edges) in the anomaly graph 204 that connect alarm nodes and infrastructure nodes. The edge scores 508 can be computed based upon a frequency of a corresponding alarm 108 and a frequency of the corresponding alarm 108 among all alarms 108 in the anomaly graph 204. For example, in one embodiment a scoring component 208 generates the edge scores 508 using a term frequency-inverse document frequency ("TF-IDF") algorithm. In this embodiment, the scoring component 208 obtains the alarms 108 generated during a particular time period. Each alarm 108 during the time period is then assigned a term frequency ("TF") based on how frequent the alarm 108 is during the time period for a particular infrastructure node. A higher TF indicates that an alarm 108 is more important to a particular infrastructure node than a lower TF.

The scoring component also computes an inverse document frequency ("IDF") for edges (i.e. alarm edges) in the anomaly graph 204 that connect alarm nodes and infrastructure nodes. The IDF defines the frequency of an corresponding alarm 108 among all alarms 108 for nodes of the same type in the anomaly graph 204 during the time period. In the case of IDF, the higher the frequency across nodes, the less important the alarm 108 is. In alternate embodiments, a document frequency ("DF") value for an alarm 108 might be used. In the case of DF, the higher the frequency across nodes, the more important the alarm 108 is.

As will be described in greater detail below, the TF and IDF scores (i.e. the edge scores 508) for alarms 108 associated with an infrastructure node can be used to calculate a node score for the node. The TF and IDF scores for alarms 108 can also be utilized to measure the similarity between infrastructure nodes in the anomaly graph 204.

In one particular implementation, the edge scores 508 are computed as follows: for one alarm $A_x$ among all alarms $\{A\}$, there are many alarm edges that belong to $A_x$ and links to infrastructure nodes corresponding to alarming infrastructure components 102. In this embodiment, the edge scores 508 can be computed as:

$$S_\alpha = \frac{Frequency_\alpha^{(A_x) \vdash [\alpha] \rightarrow E_y}}{\sum_{alarm \in A_x} Frequency_{alarm}} \cdot \log\left(\frac{|N_A|}{|alarm \in A_x|}\right)$$

where $N_A$ is the set of components that are connected to alarms 108 in A. The edge scores 508 are normalized to [0,1] in some configurations. In this regard, it is to be appreciated that mechanisms other than that described above can be utilized to compute the edge scores 508 in other configurations.

Computation of Node Scores

As described briefly above, node scores 510 (which might also be referred to herein as "anomaly confidence scores") can be computed for infrastructure nodes based on the edge scores 508. In one particular embodiment, the node scores 510 are calculated as follows using the alarm frequency and edge scores 508 for an infrastructure component ($E_y$):

$$C_{E_y} = \sum_{alarm \in E_y} Frequency_{alarm} \cdot (1 - \alpha_w + \alpha_w \cdot S_{alarm})$$

In this embodiment, $\alpha$ is a damping factor to balance the TF-IDF to the final node score. In one particular embodiment, $\alpha$ is set as 0.7. In this regard, it is to be appreciated that mechanisms other than that described above can be utilized to compute the node scores 510 in other configurations.

Propagation of Scores

In some configurations, a propagation component 210 propagates the node scores 510 between the infrastructure nodes. By propagating the node scores 510 between related infrastructure nodes, system topology information can be leveraged to detect the actual root cause of an anomaly. In one embodiment, for example, node scores 510 for infrastructure nodes having at least one associated alarm 108 are propagated to each of the connected infrastructure nodes.

The manner in which the node scores 510 are propagated between infrastructure nodes can depend upon the number of connections between infrastructure nodes or the type of infrastructure nodes. For example, if a node score 510 is propagated from one infrastructure node that is connected to a single other infrastructure node, the propagated score is the same as the initial score. If a node score 510 is propagated from many infrastructure nodes to a single other infrastructure node, the propagated score is divided by the cardinality (i.e. the number of connected infrastructure nodes). The propagated scores can be added to the initial node score 510 for each infrastructure node to arrive at a final score.

Root Cause Identification and Remedial Action

Scores generated for each infrastructure node in the manner described above can be utilized to identify a root cause of an anomaly. For example, an infrastructure component 102 having the highest score might be identified as the cause of an anomaly. Once the root cause of an anomaly has been identified, remedial action can be taken to address the anomaly and prevent future occurrences of similar anomalies. For example, and without limitation, impacted infrastructure components 102, such as server computers, might be restored to their most recent healthy state, rebooted, initialized, or otherwise reconfigured.

Remedial action can also include transmitting an alert to a system administrator. In response thereto, the administrator can initiate action to address the anomaly such as those actions described above. Other types of remedial action can be taken to address the anomaly and to prevent future occurrences of the anomaly.

Visualization

As shown in FIG. 2, a user 216, such as a system administrator, can utilize a computing device 218 to submit a query to a graph search component 212. In response thereto, the graph search component 212 can query the anomaly graph 204 to generate a UI 214 through which the user 216 can view and interact with the results of a root cause analysis performed in the manner described herein. Details regarding an illustrative UI 214 for visualizing and interacting with the results of a RCA are provided below with regard to FIG. 6.

Figure 3A:
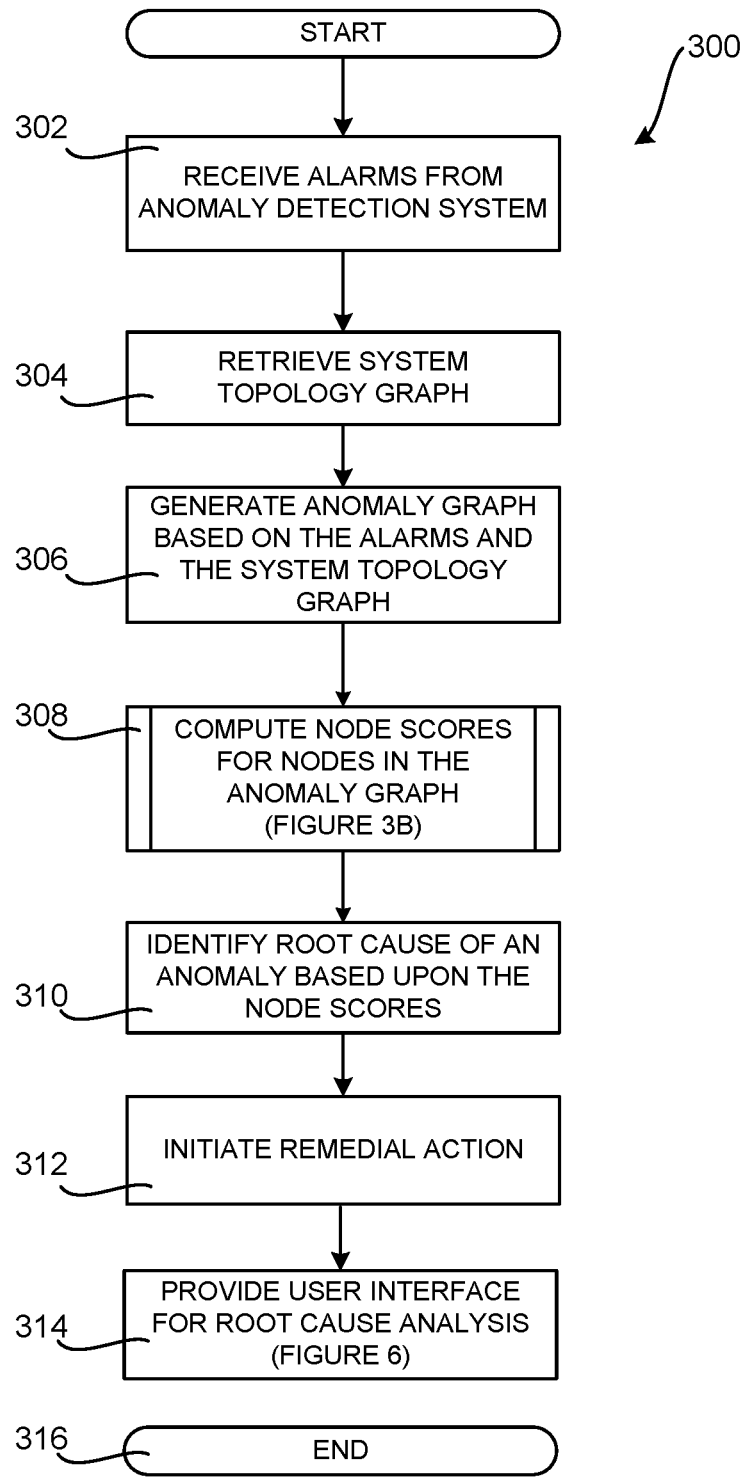
FIGS. 3A and 3B are flow diagrams showing aspects of an illustrative routine for enhancing ML-based anomaly detection systems using knowledge graphs, according to one embodiment disclosed herein.
Figure 3B:
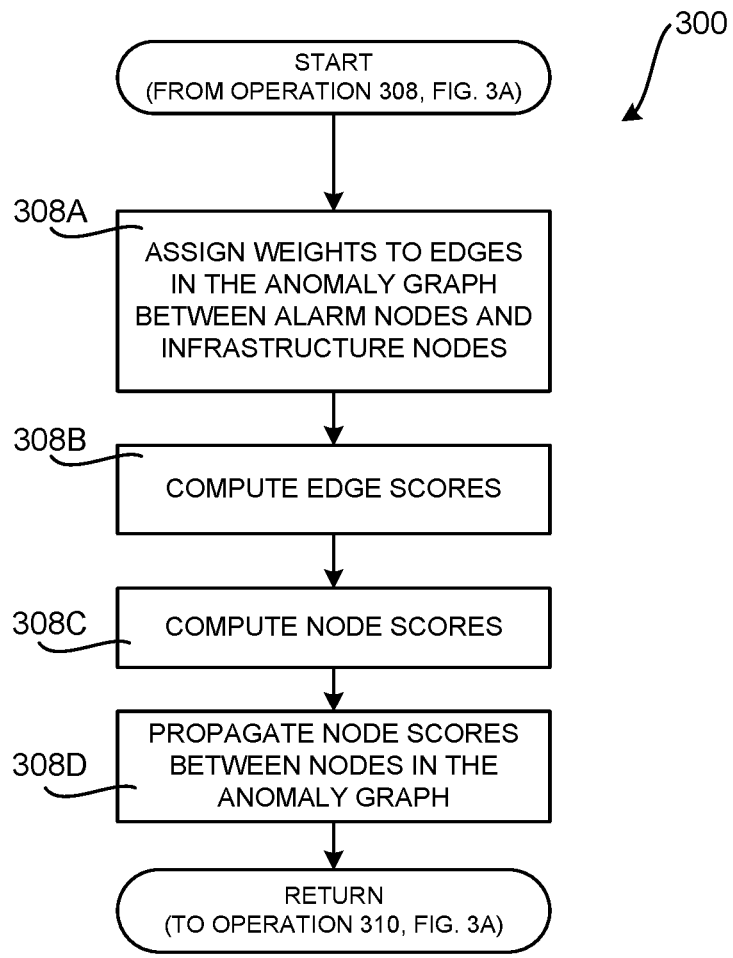

FIGS. 3A and 3B are flow diagrams showing aspects of an illustrative routine 300 for enhancing ML-based anomaly detection systems using knowledge graphs, according to one embodiment disclosed herein. It should be appreciated that the logical operations described herein with regard to FIG. 3, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300 begins at operation 302, where the graph creation component 202 of the root cause identification system 112 obtains the alarms 108 from the ML-based anomaly detection system 106. The routine 300 then proceeds from operation 302 to operation 304, where the graph creation component 202 obtains the system topology graph 206. The routine 300 then proceeds from operation 304 to operation 306.

At operation 306, the graph creation component 202 generates the anomaly graph 204 using the alarms 108 and the system topology graph 206 in the manner described above with respect to FIG. 2. The routine 300 then proceeds from operation 306 to operation 308, where the scoring component 208 generates the node scores 510. In particular, at operation 308A (shown in FIG. 3B), the scoring component 208 assigns weights 506 to edges between infrastructure nodes and alarm nodes based upon alarm 108 frequency as discussed above with regard to FIG. 2.

From operation 308A, the routine 300 proceeds to operation 308B, where the scoring component 208 computes the edge scores 508. As discussed above, the edge scores 508 are computed using an TF-IDF algorithm in some configurations. Once the edge scores 508 have been computed, the routine 300 proceeds from operation 308B to operation 308C, where the scoring component 208 computes the node scores 510 in the manner described above with regard to FIG. 2. The routine 300 then proceeds from operation 308C to operation 308D, where the scoring component 208 propagates the node scores between infrastructure nodes in the anomaly graph 204.

From operation 308, the routine 300 proceeds to operation 310, where the node scores 510 are analyzed to identify the root cause of the detected anomaly. As discussed above, in some embodiments, the infrastructure component having the highest score is considered to be the root cause of the anomaly.

From operation 310, the routine 300 proceeds to operation 312, where the root cause identification system 112 can initiate remedial action to address the identified root cause. For example, and without limitation, impacted infrastructure components 102 might be restored to their most recent healthy state, rebooted, initialized, or otherwise reconfigured. Other types of remedial action can also be taken in other configurations.

The routine 300 then proceeds from operation 312 to operation 314, where the root cause identification system 112, the graph search component 212, or another component, can provide a UI 214 for searching, viewing, and interacting with the anomaly graph 204. Details regarding one illustrative UI 214 for providing this functionality will be provided below with regard to FIG. 6. From operation 314, the routine 300 then proceeds to operation 316, where it ends.

Figure 6:
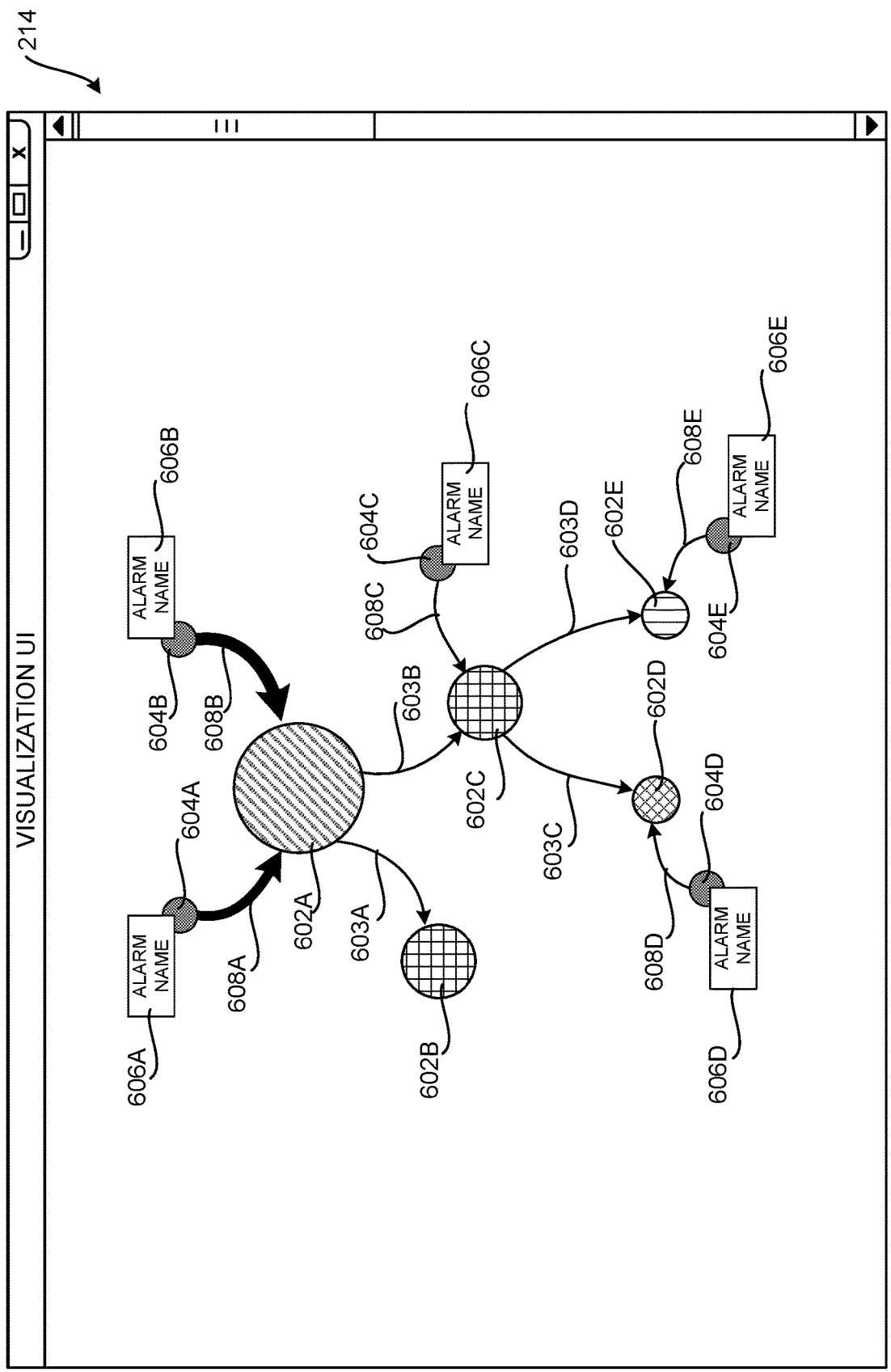
FIG. 6 is a user interface diagram showing aspects of an illustrative user interface disclosed herein for viewing the results of a root cause analysis performed using the technologies disclosed herein.

FIG. 6 is a user interface diagram showing aspects of an illustrative UI 214 disclosed herein for viewing results of a root cause analysis performed using the technologies disclosed herein. As shown in FIG. 6, the UI 214 can include UI elements 602A-602E (e.g. a circle, square, or other geometric shape) that correspond to infrastructure components 102, such as an infrastructure component 102 identified as the root cause of an anomaly and its dependent infrastructure components 102. The UI 214 can also include UI elements 603A-603D (e.g. straight or curved lines) connecting the UI elements 602A-602E corresponding to the infrastructure components 102.

The UI 214 can also include UI elements 604A-604E that correspond to alarms 108. The UI elements 604A-604E can also provide other information regarding an alarm, such as the associated UI elements 606A-606E indicating the name of an alarm 108 or other information about an alarm.

The UI 214 can also include UI elements 608A-608E (e.g. straight or curved lines) that indicate an association between an alarm 108 and a node 602A-602E corresponding to an infrastructure component 102. For instance, in the example shown in FIG. 6, five alarms 108 are present in the illustrated topology. In particular, the infrastructure component 102 represented by the node 602A has two alarms 108, the infrastructure component 102 represented by the node 602C has one alarm 108, the infrastructure component 102 represented by the node 602D has one alarm 108, and the infrastructure component 102 represented by the node 602E has one alarms 108. The infrastructure component 102 represented by the node 602B has no alarms 108.

In some configurations, various attributes (e.g. color, line thickness, or size) of UI elements can be modified based upon the computed node scores, the severity of an alarm, or other factors. For instance, in the illustrated example, the UI elements 602A-602E have been sized according to their node scores 510. Because the infrastructure component 102 corresponding to the UI element 602A has the highest node score 510, the UI element 602A is larger in size than the other UI elements 602B-602E. As another example, the UI elements 608A and 608B are rendered thicker than the UI elements 608C-608E to indicate that the infrastructure component 102 corresponding to the UI element 602A is the most likely cause of an anomaly. Other visual attributes of the UI elements in the UI 214 can be modified to convey other types of information in other embodiments.

The UI 214 can also provide other types of functionality not shown in FIG. 6. For example, the results of a search of the anomaly graph 204 might be returned in a sorted and aggregated way, thereby enabling users 216 to browse over UI elements illustrating the root cause, the alarm types, alarm frequency, and topology for the suspected infrastructure components 102. The UI 214 can also enable searching for particular infrastructure components 102, searching by type of component, searching during a particular time period, and/or using other types of filters. In this regard, it is to be appreciated that the UI 214 shown in FIG. 6 is illustrative and that the contents of the anomaly graph 204 might be visualized in other ways in other configurations.

Figure 7:
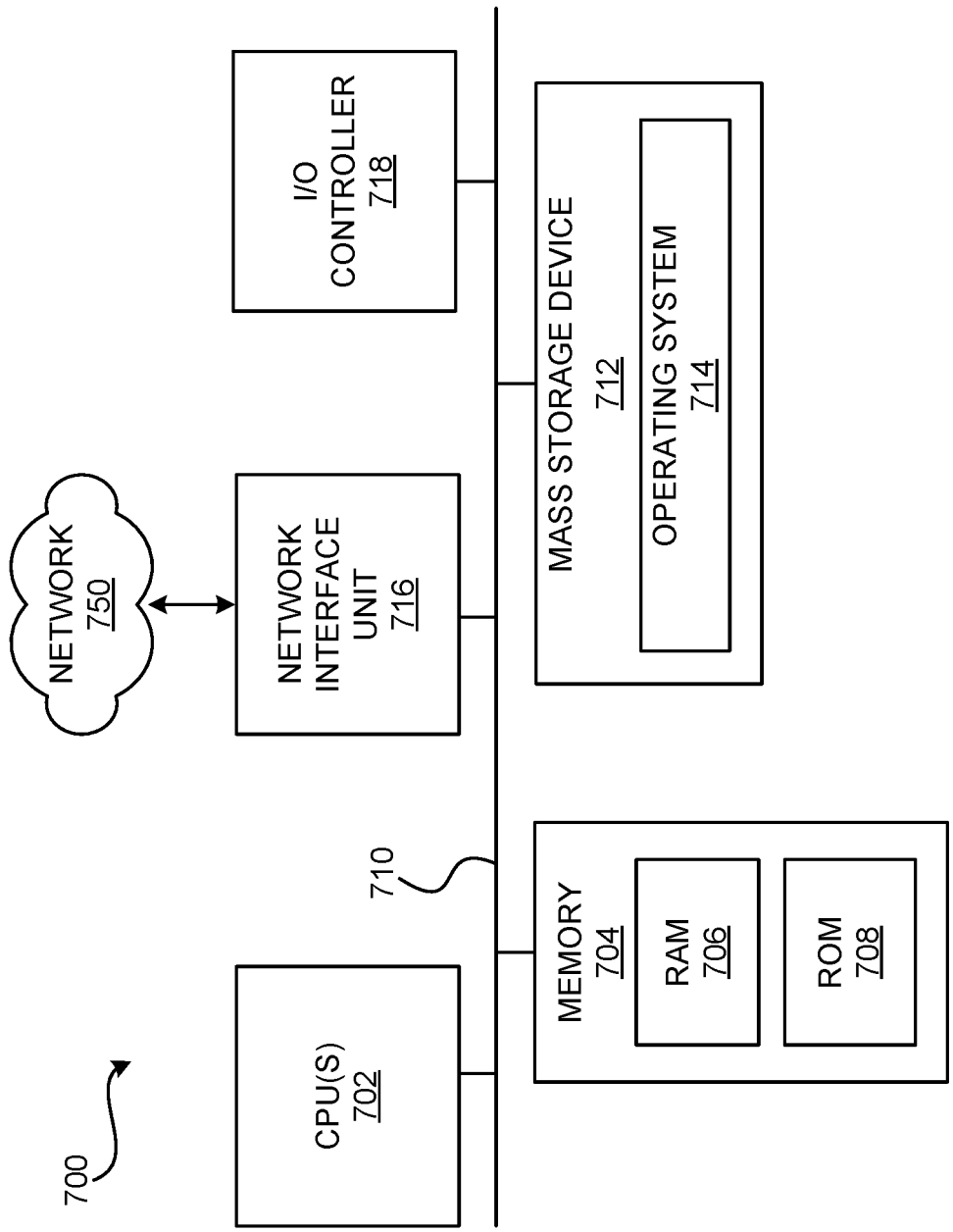
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, and one or more executable programs, such as programs for implementing the anomaly detection system 106 and the root cause ID system 112.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 710. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7). It should also be appreciated that via a connection to the network 750 through a network interface unit 716, the computing architecture might enable the product of the prefetch engine 108 to be distributed.

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
    generating a connected graph including:
        infrastructure nodes and alarm nodes, each of the infrastructure nodes representing an infrastructure component and each of the alarm nodes representing an alarm generated by an anomaly detection system,
        first edges connecting at least a portion of the infrastructure nodes, the first edges representing dependencies between infrastructure components, and
        second edges connecting alarm nodes to infrastructure nodes, the second edges defining an association between an infrastructure component and an alarm, an infrastructure node being connected to an alarm node via a second edge responsive to detection of an anomaly with the infrastructure component represented by the infrastructure node, and the alarm represented by the alarm node indicating the anomaly;
    computing scores for the infrastructure components based upon the connected graph; and
    identifying a root cause of an anomaly based, at least in part, on the scores computed for the infrastructure components.

2. The computer-implemented method of claim 1, wherein the anomaly detection system includes a machine learning component.

3. The computer-implemented method of claim 2, wherein the machine learning component generates the alarm based on analysis of real-time data metrics.

4. The computer-implemented method of claim 2, wherein the machine learning component is based on a clustering-based model, a forecasting-based model, or a smoothing-based model.

5. The computer-implemented method of claim 2, wherein the machine learning component is configured to generate alarms using unsupervised machine learning.

6. The computer-implemented method of claim 1, wherein scores computed for the second edges are based, at least in part, on a frequency of a corresponding alarm and a frequency of the corresponding alarm among all alarms for the alarm nodes.

7. The computer-implemented method of claim 6, wherein the scores for the infrastructure components are computed by generating a node score for each of the infrastructure nodes and propagating node scores between the infrastructure nodes.

8. The computer-implemented method of claim 1, further comprising presenting a user interface (UI), the UI including:
    first UI elements corresponding to the infrastructure nodes,
    second UI elements corresponding to the first edges,
    third UI elements corresponding to the alarm nodes, and
    fourth UI elements corresponding to the second edges.

9. The computer-implemented method of claim 8, wherein a visual attribute used to present the first UI elements in the UI is modified based, at least in part, on a score for associated infrastructure components.

10. The computer-implemented method of claim 8, wherein a visual attribute used to present the fourth UI elements in the UI is modified based, at least in part, on a severity of alarms generated by the anomaly detection system.

11. A computing system, comprising:
    one or more processors; and
    a computer-readable storage medium storing computer-executable instructions that are executable by the one or more processors to perform operations including:
        generating a connected graph defining a topology of infrastructure components and alarms generated by a machine learning component, the connected graph generated to include infrastructure nodes and alarm nodes, wherein:
            each of the infrastructure nodes represents an infrastructure component and each of the alarm nodes represents an alarm; and
            an alarm node is connected to an infrastructure node by an edge in the connected graph, the infrastructure node being connected to the alarm node via the edge responsive to detection of an anomaly with the infrastructure component represented by the infrastructure node, and the alarm represented by the alarm node indicating the anomaly;

computing scores for the infrastructure components based upon the connected graph, and identifying a root cause of an anomaly based, at least in part, on the scores computed for the infrastructure components.

12. The computing system of claim 11, wherein the connected graph includes:

first edges connecting at least a portion of the infrastructure nodes, the first edges representing dependencies between the infrastructure components; and second edges connecting alarm nodes to infrastructure nodes, the second edges defining an association between an infrastructure component and an alarm.

13. The computing system of claim 11, wherein the machine learning component generates the alarms based on analysis of real-time data metrics.

14. The computing system of claim 11, wherein the machine learning component is based on a clustering-based model, a forecasting-based model, or a smoothing-based model.

15. The computing system of claim 12, wherein the operations further include presenting a user interface (UI), the UI including:

first UI elements corresponding to the infrastructure nodes, second UI elements corresponding to the first edges, third UI elements corresponding to the alarm nodes, and fourth UI elements corresponding to the second edges.

16. A computer-readable storage medium storing computer-executable instructions that are executable by a processor to cause the processor to perform operations including:

generating a connected graph defining a topology of infrastructure components and alarms generated by a machine learning component, the connected graph including infrastructure nodes and alarm nodes, wherein:

each of the infrastructure nodes represents an infrastructure component and each of the alarm nodes represents an alarm; and an alarm node is connected to an infrastructure node by an edge in the connected graph, the infrastructure node being connected to the alarm node via the edge responsive to detection of an anomaly with the infrastructure component represented by the infrastructure node, and the alarm represented by the alarm node indicating the anomaly;

computing scores for the infrastructure components based upon the connected graph; and identifying a root cause of an anomaly based, at least in part, on the scores computed for the infrastructure components.

17. The computer-readable storage medium of claim 16, wherein the connected graph includes:

first edges connecting at least a portion of the infrastructure nodes, the first edges representing dependencies between the infrastructure components represented by the infrastructure nodes; and second edges connecting alarm nodes to infrastructure nodes, the second edges defining an association between an infrastructure component and an alarm.

18. The computer-readable storage medium of claim 16, wherein the machine learning component generates the alarms based on analysis of real-time data metrics.

19. The computer-readable storage medium of claim 16, wherein the machine learning component is based on a clustering-based model, a forecasting-based model, or a smoothing-based model.

20. The computer-readable storage medium of claim 17, wherein the operations further include presenting a user interface (UI), the UI including:

first UI elements corresponding to the infrastructure nodes, second UI elements corresponding to the first edges, third UI elements corresponding to the alarm nodes, and fourth UI elements corresponding to the second edges.

* * * * *